United States Patent [19]

DiStefano et al.

[11] Patent Number: 4,600,837
[45] Date of Patent: Jul. 15, 1986

[54] OPTICAL SCANNING APPARATUS WITH DYNAMIC SCAN PATH CONTROL

[75] Inventors: Thomas H. DiStefano, Bronxville; Mark Johnson, Mt. Kisco, both of N.Y.

[73] Assignee: International Business Machines Corporation, Armonk, N.Y.

[21] Appl. No.: 557,491

[22] Filed: Dec. 1, 1983

[51] Int. Cl.⁴ .................................. H01J 3/14
[52] U.S. Cl. ........................... 250/235; 358/293
[58] Field of Search ........... 250/234, 235, 236, 237 R, 250/237 G; 358/293

[56] References Cited

U.S. PATENT DOCUMENTS

| | | | |
|---|---|---|---|
| 4,279,472 | 7/1981 | Street | 250/235 |
| 4,314,154 | 2/1982 | Minoura et al. | 250/235 |
| 4,429,220 | 1/1984 | Noguchi | 250/237 G |
| 4,490,608 | 12/1984 | Yeadon et al. | 250/235 |
| 4,516,023 | 5/1985 | Morrill et al. | 250/235 |

Primary Examiner—David C. Nelms
Assistant Examiner—James Gatto
Attorney, Agent, or Firm—Ronald L. Drumheller

[57] ABSTRACT

The system includes a primary scanner which produces a scanning optical beam, and a photoresponsive error sensor which measures over the scan path the successive differences between the actual position of the scanning beam and the desired position of the scanning beam and produces error signals. The secondary scanner is connected to the error sensor for response to the error signals to dynamically correct the position of the scanning beam during the course of the scan. The primary scanner provides a main optical scanning beam and an auxiliary optical scanning beam traversing substantially the same optical path. The error sensor includes a graticule mask having a substantially uniform optical density along the desired scan path and a graded optical density transverse to the desired scan path of the auxiliary scanning beam.

32 Claims, 15 Drawing Figures

FIG. 5.1
SCAN HIGH

FIG. 5.2
SCAN LOW

FIG. 5.3
SCAN CORRECT

FIG. 5.4
CLOCK

FIG. 5.5
PHASE ERROR

OPTICAL SCANNING APPARATUS WITH DYNAMIC SCAN PATH CONTROL

DESCRIPTION

1. Technical Field

This invention relates to optical scanning apparatus which is particularly useful for high resolution optical scanner document readers and high resolution optical scanner printers.

2. Prior Art

In optical scanners, such as laser scanners, which employ mechanical scanning devices such as oscillating mirrors or rotating mirrors, achievement of accuracy of the scan is a serious problem. For instance, in any machine which involves moving mechanical parts, a certain amount of mechanical vibration is encountered. Not only are there moving reflectors in such systems, but also the scanners usually scan across a medium on a rotating drum with a drum drive mechanism. The vibrations result in small deviations of the beam from a straight path. Such deviations are sometimes referred to as transverse beam errors.

A preferred means for accomplishing the mechanical scan is by a rotating multifaceted mirror. Since it is extremely difficult to produce such mirrors with all of the facets in exactly corresponding orientations, a slight facet tilt misorientation is often encountered, causing the beam to deviate transversely from the nominal scan line, causing highly objectionable variations in line-to-line scan spacing.

The last mentioned problem has been previously recognized and one effort at correction on an experimental basis was described in a periodical publication entitled *Optics and Laser Technology* for December 1975 beginning at page 240 in a paper entitled "Correction of Axial Deflection Errors in Rotating Mirror Systems" by J. Helmberger, K. Stadler, and F. Bestenreiner. In that system, facet tilt errors for each facet of the rotating mirror were determined, and a correction mechanism was preprogrammed to insert a deflection error correction into the beam at the time each facet was reflecting. This system was apparently effective for this specific type of error, but only one correction value was provided for each facet (each scan), and the corrections were not truly dynamic and did not correct for other problems, such as vibration. Another approach to the correction of transverse scanning errors is illustrated in U.S. Pat. No. 4,203,672 issued May 20, 1980 to Edmund H. Smith, Jr. of Wilmington, Del. That system is basically intended for inspection of web materials for optical detection of pinholes and includes optical cells arranged at the respective ends of the scan path to detect displacements of the scan and to provide scan path correction signals. However, here again, the corrections are not dynamic within the meaning of that term as used in the present invention because the beam position detection used for position correction is only provided effectively once per scan.

Accordingly, it is one object of the invention to provide a scanning optical beam system having an improved means for dynamic correction of transverse beam errors.

Another problem with the use of multifaceted mirrors for providing the scan operation is facet skew, a variation in the rotational position of the facets about the axis of the polygon. This effect is commonly dealt with by means of start and end of scan detectors which are used to time the beginning and ending of the scan operations. Systems have also been devised for dynamically correcting the rate of scan by signals derived through an optical grating which provide timed pulses to determine the rate of scan as well as the beginning and the ending of the scan. Such a system is disclosed, for instance, in the Dattilo et al U.S. Pat. No. 3,835,249 issued Sept. 10, 1974 for a SCANNING LIGHT SYNCHRONIZATION SYSTEM assigned to International Business Machines Corporation of Armonk, N.Y.

However, it is another object of the present invention to provide for dynamic scan synchronization in conjunction with a dynamic scan path control, and to therefore provide for synchronization in a more integrated and economical way.

Further objects and advantages of the invention will be apparent from the following description and the accompanying drawings.

SUMMARY OF THE INVENTION

In carrying out the invention there is provided a scanning optical beam system comprising a primary scanning means which produces a scanning optical beam having a scan path close to the desired scan path, a photoresponsive error sensing means which measures over substantially the entire scan path the successive differences between the actual position of the scanning beam and the desired position of the scanning beam and produces error signals, and a secondary scanning means connected to said error sensing means for response to said error signals and operable to dynamically correct the position of the scanning beam during the course of the scan so as to reduce the errors in the actual beam position.

BRIEF DESCRIPTION OF THE DRAWINGS

FIGS. 5.1, 5.2, and 5.3 represent signals derived from an optical scan across the graticule of FIG. 4 with the beam high, the beam low, and the beam in the correct middle course respectively.

FIGS. 5.4 and 5.5 show idealized rrpresentations of signal curves representing a reference clock signal and a phase correction signal respectively, the phase correction signal being derived from a scan of the graticule of FIG. 4 in relation to the reference clock.

DETAILED DESCRIPTION OF THE PREFERRED EMBODIMENTS OF THE INVENTION

Figure 1:
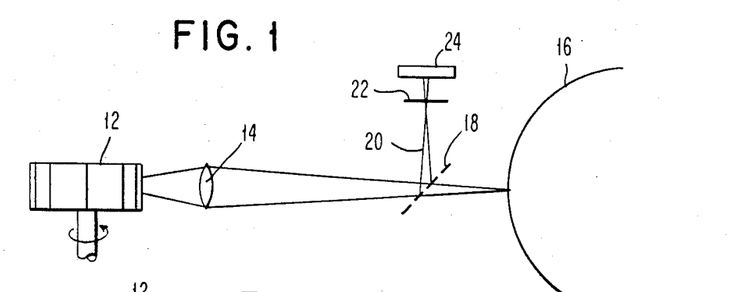
FIG. 1 is a simplified schematic side view of a scanning beam system in accordance with the present invention.
Figure 2:
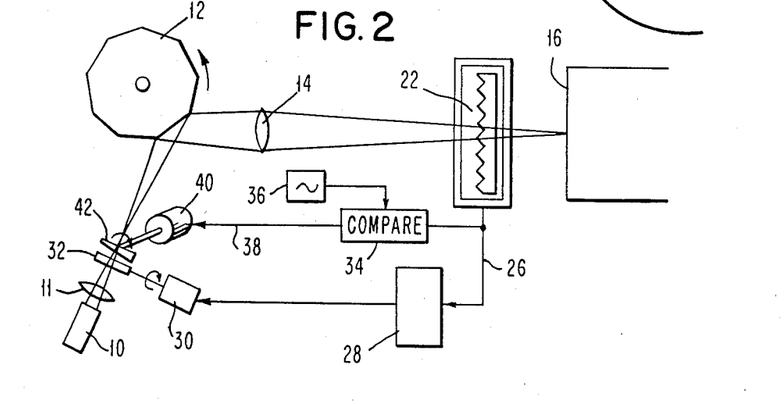
FIG. 2 is a bottom view of the system of FIG. 1, including schematic representations of the electrical circuits and components of the system.

Referring more particularly to FIGS. 1 and 2, there is illustrated a schematic representation of a system in accordance with the present invention, FIG. 1 representing a side view, and FIG. 2 a bottom view of the system. The system as illustrated in FIGS. 1 and 2 includes a light source 10, (which is preferably a laser), a lens 11, a rotating polygonal multifaceted mirror 12, imaging optics schematically indicated by lens 14, and a rotating drum 16 for carrying the scanned image.

A beam splitter is provided at 18 (FIG. 1) for diverting a part of the radiation energy into an auxiliary beam 20 which is imaged onto a graticule mask 22. The light transmitted through the graticule mask 22 is detected by a photodetector 24. Because of the optical characteristics of the graticule mask 22, the optical signal received by the photodetector 24 varies in response to lateral deviations of the scanning beam. This variation in signal at the detector 24 is carried through a circuit shown at 26 in FIG. 2 to a demodulator 28 which develops a resultant correction signal which is fed to a correction device 30. Device 30 is schematically illustrated as an electromagnetically operated deflector which is connected to rotate a prism 32 about an axis parallel to the direction of scan for providing lateral correction to the direction of the optical beam as it is emitted from the laser 10 via lens 11. The combination of elements including the rotatable prism 32 is sometimes referred to in this specification as a "secondary scanning means."

It will be seen that the imaging system of FIGS. 1 and 2 is common to the main beam and the auxiliary beam and that system is operable to focus the image of the main beam at a plane corresponding to the surface of the drum 16 which is to be scanned, and the graticule 22 is arranged at a conjugate image plane at which the auxiliary beam is imaged.

Because of the design of the graticule 22, which includes a pattern of regularly spaced portions of greater and lesser optical density, the signal detected by the optical detector 24 consists of a series of pulses which can be used to control the rate or synchronization of scan as well as the positioning of the scanning beam transverse to the direction of scan. The rate or synchronization of scan function is provided by means including a comparison circuit 34 which receives the signals from circuit 26, and which is also connected to receive clock pulses from a clock pulse source 36. The comparison circuit 34 is operable in response to that comparison to generate correction signals which are transmitted through connection 38 to a phase correction or synchronizing device schematically shown at 40. Device 40 is operable to provide for phase correction of the scan by rotation of a prism 42 about an axis perpendicular to the scan direction.

It is most important that the rate of scan and the position of the scanning beam through each scan be accurately synchronized with any modulation of the optical beam from the source 10. While not illustrated in FIGS. 1 and 2, it is contemplated that the system may be employed for printing, and will then include some means for modulating the radiation from source 10. Rather than physically modifying the rate of scan, the modulating data rate may be varied under the control of the comparison circuit 34. If the scanning beam system is employed as an optical reading means, synchronization with the reading function must be maintained. In that instance, the reading data rate may be controlled by the circuit 34, rather than physically modifying the rate of scan.

The synchronization of the modulation or of the reading function are collectively referred to below as a synchronization of information transfer.

The system including the light source 10, the polygonal mirror 12, and the imaging optics 14 may be characterized as a primary scanning means which produces a scanning optical beam having a scan path close to the desired scan path. The combination of the graticule mask 22, the photo-optical detector 24, and the demodulator 28 may be characterized as a photoresponsive error sensing means, and the combination of the rotatable prism 32 and the schematically illustrated electromagnetic deflection motor 30 for that prism may be characterized as a secondary scanning means to dynamically correct the position of the scanning beam during the course of the scan.

The imaging optics 14 will normally be considerably more complex than the simple lens illustrated, and may be similar to the optics disclosed in the prior U.S. Pat. No. 3,835,249 mentioned above. However, the lens 14 will be understood to schematically represent the imaging optics components which preferably form an image of the beam at the surface of the drum 16. Referring especially to FIG. 1, the mask 22 is positioned so as to be at a conjugate imaging plane for the auxiliary beam corresponding to the plane of the image at the surface of drum 16. The photoresponsive element 24 is pictured in FIGS. 1 and 2 as being quite large, since it must intercept the scanning beam of the auxiliary scan over the entire scan path.

However, it will be understood that various means such as parabolic reflectors may be used to concentrate the light transmitted through the graticule mask 22 onto a small photoresponsive device.

The beam splitter 18 may be a partially reflective mirror which transmits the main beam and deflects the auxiliary beam in any desired proportion of radiant energy. In the bottom view of FIG. 2, the beam splitter 18 is not shown (or assumed to be completely transparent) so as to permit a bottom view of the graticule mask 22.

Figure 3:
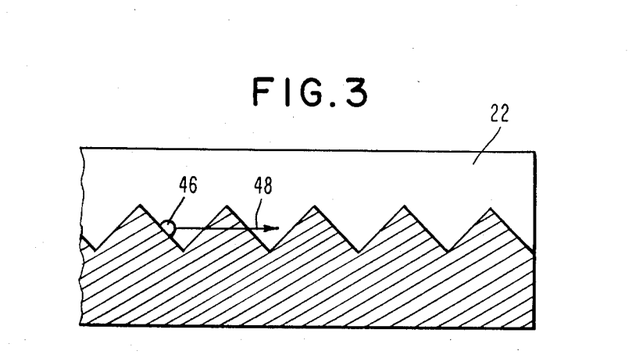
FIG. 3 is an enlarged detail view of a portion of a graticule mask which is used in the system of FIGS. 1 and 2 to detect lateral displacement of a scanning beam as it is scanned.

FIG. 3 is an enlarged partial detail view of one end of the graticule mask 22. To illustrate the operation of the mask, a focused spot of light is shown at 46 as it scans along the center line of the mask, as indicated by the arrow 48. If there is no error in the transverse position of the picture element as it scans along the mask, the picture element cuts through essentially the midpoint of each of the rising and falling edges of the opaque sections of the mask. The opaque sections are shown crosshatched, and the remainder of the mask is essentially transparent.

If the position of the scan spot is displaced upward in the drawing (transverse to the direction of scan), the pulses of the beam transmitted through the transparent portion of the graticule to the photoelectric detector 24 become longer relative to the interval between pulses. If the displacement is downward, the pulses of transmitted beam will be shorter. These changes in the illumination signals are detected to provide the dynamic correction in the scan. The pattern of the opaque mask elements of the graticule as illustrated in FIG. 3 is seen to resemble the toothed edge of a saw blade.

Figure 4:
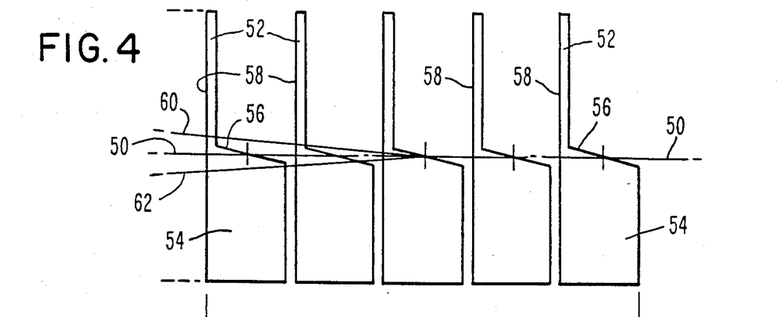
FIG. 4 is an abbreviated view of an alternative form of the graticule mask of FIG. 3.

FIG. 4 represents a modification of the graticule mask arrangement of FIG. 3. Again, the graticule of FIG. 4 represents only one end of the entire graticule, and the individual elements are shown in an enlarged scale. In the preferred form of the invention, the graticule mask is long enough so as to extend over the entire scan path of the auxiliary beam. In one preferred embodiment, this path is about fifteen inches long and there are five mask elements for each inch so that there are seventyfive elements for the entire mask.

In FIG. 4, the desired scan path is indicated by a center line 50. The graticule elements in FIG. 4 are completely separated from one another. The graticule may be said to have a graded optical density transverse to the scan path 50 such that the density is less in the upper part of the figure where the elements each have a narrow portion 52, and a higher density in the lower portion of FIG. 4 where each element has a wide portion 54. This statement applies to FIG. 3 as well as FIG. 4. In FIG. 4, between the narrow portion 52 and the wide portion 54 is a sloped portion 56, and the desired scan path 50 bisects that sloped portion 56. While the graded optical density is disclosed in FIG. 3 and FIG. 4 as accomplished by a proportioning of opaque and transparent areas, it will be apparent that a graded optical density may be provided in other ways, and still accomplish many of the functions of this invention.

One of the advantages of the graticule pattern of FIG. 4 is that, where the scan is accomplished from left to right, the leading edge (the edge of each element, as indicated at 58) which is first encountered by the scanning beam is a substantially straight edge which provides a consistent signal for adjusting for scan phase errors for timing the scan and for the correlation between the scan phase and the modulation of the scanning beam.

FIGS. 5.1, 5.2, 5.3, and 5.5 illustrate the forms in which error signals derived from the scan of the auxiliary beam over the graticule of FIG. 4 can be generated. FIG. 5.1 illustrates a "scan high" transverse error signal. FIG. 5.2 illustrates a "scan low" transverse error signal. FIG. 5.3 illustrates the signal generated by the system when there is no transverse error. FIG. 5.4 illustrates a pulse signal available from a system clock for determining the phase error in the scan and for synchronizing the operation of the scanning beam with the system clock. This is usually required in order to synchronize a transfer of information by means of the scanning beam.

Figure 54:
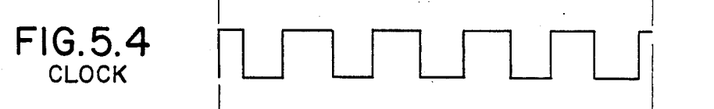
Figure 55:
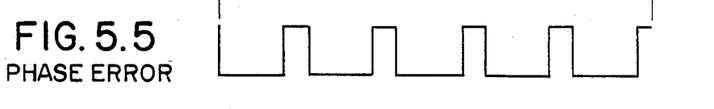

FIG. 5.5 is a curve indicating phase errors resulting from a comparison of the signals obtained from the scan of the graticule with the system clock signals of FIG. 5.4.

In FIG. 4, the curved line 60 illustrates a scan path which is initially transversely displaced upwardly from the desired scan path 50 at the left side of FIG. 4. Similarly, line 62 represents a scan path which is initially displaced transversely downwards from the desired scan path 50.

Figure 51:
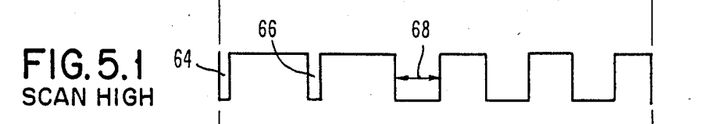

The high scan signal pattern of FIG. 5.1 results from the high scan path 60 of FIG. 4. As shown in FIG. 4, in the high scan path 60, the transmission of light through the graticule is only interrupted during a brief interval corresponding to the narrow width of the narrow portion 52 of the first graticule element, resulting in a low signal at 64 in the FIG. 5.1 curve. The light is not again interrupted until the scan path 60 traverses the narrow portion 52 of the next graticule element, as indicated at 66. However, the system soon corrects for the high transverse error, and at the intersection of the scan line 60 with the third graticule element, the interruption of the beam lasts for an interval 68 which extends to the midpoint of the sloping portion 56 of that element, indicating a zero transverse error. The remaining interruptions are of equal duration, indicating a continuation of a zero transverse error. In a practical system there may be a small over-shoot in correction and a subsequent reverse correction. The dynamics of this correction are determined both by the correction mechanism, and by the electronic control loop.

Figure 52:
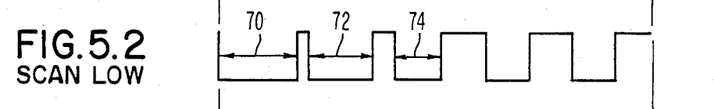

For the low scan path 62, the scan is interrupted at the first graticule element for the entire width of the element, as indicated at 70 in FIG. 5.2. Again, when the scan 62 intercepts the second graticule element, the interruption of the scan beam lasts for almost the entire width of that element, as indicated at 72 in FIG. 5.2. However, the system quickly corrects again, and the scan beam interruptions beginning at 74 and continuing on to the end of FIG. 5.2 are of the standard duration, indicating zero error.

Figure 53:
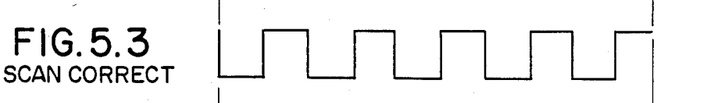

As indicated in FIG. 5.3, when the scan is correct (no transverse error), the interruptions of the scanning beam are all of the standard zero duration corresponding to the duration shown at 68 and 74 in FIGS. 5.1 and 5.2.

It may be said that the lateral displacement errors phase modulate the "carrier" generated by the signal interruptions generated by the scanning of the graticule. The advantage of the shallow slope 56 of each of the graticule elements is that a very slight deviation from the desired scan path causes a substantial correction signal so that the system is very sensitive in maintaining the exact path desired. However, if the deviation is beyond the sloped section 56, the narrow portion 52, or the wide portion 54 provide a strong correction signal in the right direction. Thus, it may be stated that the shape of the graticule elements in FIG. 4 represents a special case of a preferred type of graticule mask elements which may be more generally described as being shaped to provide a non-uniform rate of change in width when measured from one side of the graticule to the other, with the greatest rate of change occuring in the central portion (corresponding to the shallow slope 56 in FIG. 4) across the desired scan path to enhance the sensitivity of the system to changes in transverse positions.

Figure 6:
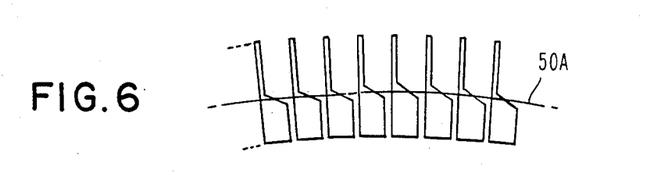
FIG. 6 represents a graticule mask corresponding to FIG. 4, but arranged to provide for a curved scan path.

The desired path need not necessarily be a straight line, as indicated at 50 in FIG. 4, but may be any predetermined line such as a curved line as indicated at 50A in FIG. 6. The graticule elements are positioned to define the desired scan path. For instance, in FIG. 6, the graticule elements are arranged in a curve to define the curved path 50A. The path will generally be either a straight line or a simple curve. However, it will be obvious that any desired path may be defined, and the transverse error correction circuitry will cause the scan to follow that path.

As previously mentioned, FIG. 5.4 shows a series of clock pulses which may be used to determine a phase error correction signal for controlling the rate of the scan along the desired path 50. FIG. 5.5 represents phase error signals which are generated within the compare circuit of FIG. 34. Each phase error pulse in FIG. 5.5 is determined by commencing the pulse in response to the commencement of a corresponding clock signal pulse of FIG. 5.4, and ending the phase error pulse by a signal derived from the next leading edge 58 of a corresponding graticule element of FIG. 4. If the phase synchronization of the scan is not correct in relation to the clock, then the width of the phase error pulses changes, and the phase of the scan is correspondingly corrected by the operation of the compare circuit 34, and the devices 40 and 42 of FIG. 2. An alternative method of synchronization is to adjust the clock phase by means of the output from the compare circuit 34 instead of adjusting the phase of the scan.

Figure 7:
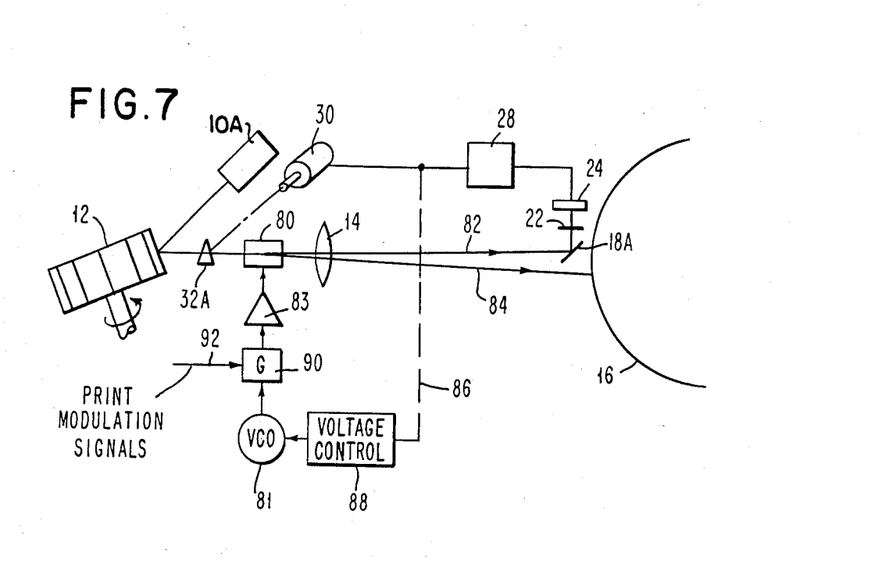
FIG. 7 is a schematic representation of a modification of the system of FIGS. 1 and 2.

FIG. 7 is a schematic representation of a modification of the system of FIGS. 1 and 2 employing a helium-neon laser light source, and including an acousto-optical modulator 80 arranged in the optical path of the scanning beam after reflection by the polygonal mirror 12. Acousto-optical modulator 80 is operable to pass an unmodulated and undeflected beam 82 at all times. This beam is used as the auxiliary beam which is intercepted by a mirror 18A and directed through graticule 22 to the optical detector 24. The optical modulator is operable to modulate a part of the beam energy to provide for transmission of printing information to the surface of the drum through a main modulated beam 84. This arrangement has the advantage that where an acousto-optical modulator is to be employed, it is not necessary to provide a beam splitter since the energy is already split by the acousto-optical modulator.

The signals to the acousto-optical modulator 80 are provided from a voltage controlled oscillator 81 through a gate 90 and an amplifier 83. The print modulation signals, which are supplied at 92 to the gate 90, control the operation of gate 90 to provide the desired "on" and "off" operation of the main beam. A voltage control circuit 88 is provided for controlling the voltage to the voltage controlled oscillator 81.

As in the FIGS. 1 and 2 embodiments, the embodiment of FIG. 7 includes the transverse displacement error detection circuit 28 and the correction components 30 and 32A consisting of mechanical displacement motor 30 and a prism 32A which is rotatable by the motor 30. As an alternative means of transverse displacement error correction, the error correction signal may be carried from the error detection circuit 28 through a dotted connection 86 to the voltage control circuit 88 to modify the voltage input to the voltage controlled oscillator 81.

When connection 86 is employed, the components 30 and 32A may be omitted. This arrangement has the virtue that transverse error correction of the beam is accomplished very rapidly by means of the acousto-optical modulator and without the additional components 30 and 32A. There is one problem, however, that the transverse error correction is no longer a closed loop servo because the undeflected auxiliary beam 82 is not corrected by the acousto-optical modulator in response to the signals transmitted through connection 86. However, with proper design very satisfactory results are attainable without the closed loop feature. It is preferred, however, to provide a closed loop system and that is one of the reasons for the embodiment of FIG. 8 which is described below.

As previously mentioned above, one of the problems in the embodiment of FIGS. 1 and 2 is to provide for a photoresponsive detector 24 which will gather all of the light transmitted through graticule 22. Having a large photodetector device is inconvenient and when a small photodetector is to be employed, there is the necessity for providing a parabolic reflector or some other optical arrangement for gathering all of the radiant energy such as a light "pipe". This is another reason for the embodiment of FIG. 8.

Figure 8:
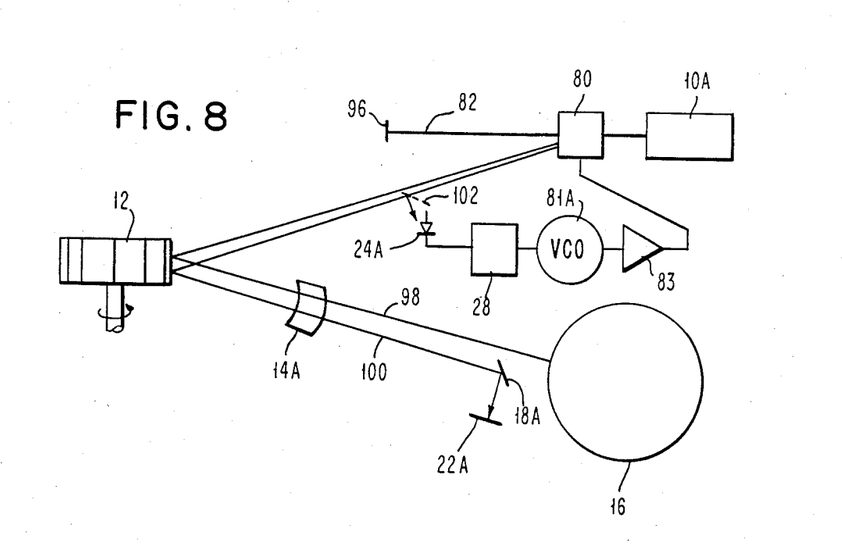
FIG. 8 is a schematic representation of a modification of the system of FIG. 7 employing a retroreflector graticule rather than a light transmitting graticule.

In the embodiment of FIG. 8, the unmodulated beam 82 is simply directed to a barrier 96. The acousto-optical modulator 80 is provided with two control frequencies from a voltage controlled oscillator 81A which is capable of providing those two frequencies for modulating the information to be transmitted to the drum 16. The two modulating frequencies, amplified by amplifier 83, operate on the acousto-optical modulator 80 to provide two different angles of deflection for two separate modulated beams 98 and 100. The beam 98 is used as the main beam directed to the drum 16, and the beam 100 is used as the auxiliary beam, which is directed to the graticule 22A.

In this embodiment, the graticule mask is actually a retroreflector having substantial reflectivity properties in the areas which have previously been referred to as being transparent, and having a low reflectivity in those areas previously referred to as being opaque. The energy of the beam is thus caused to be selectively reflected back along the same path of beam 100 from which the energy from that beam was received, and is directed by means of a beam splitter 102 to a photodiode photoresponsive detector 24A which provides the signal to the lateral error detection circuit 28. By reflecting the energy back through the same optical system, and through the rotating polygonal mirror 12, the energy of the beam which was spread out by the scanning operation of the mirror 12 is again concentrated at the beam splitter 102, and is thus concentrated upon the photodiode 24A.

One of the major advantages of the system of FIG. 8 is that the transverse error signals from the circuit 28 control the voltage controlled oscillator 81A to adjust both of the frequencies emitted by oscillator 81A to deflect and correct the directions of both of the beams 98 and 100. Thus, the acousto-optic modulator may be employed as the dynamic lateral beam correction device in a system which has closed loop capabilities. As the auxiliary beam position is adjusted, the error signal is reduced, and overcorrection is avoided. All of the conventional wisdom of servo control theory may be applied to obtaining an optimum response to perturbations.

Figure 9:
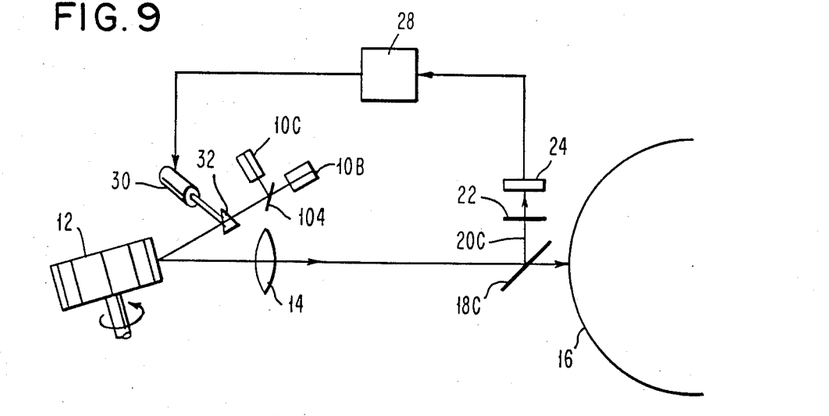
FIG. 9 is a schematic representation of another modification of the system of FIGS. 1 and 2 employing two different lasers as separate light sources for a main beam and an auxiliary beam.

FIG. 9 is another modification of the embodiment of FIGS. 1 and 2 in which solid state gallium arsenide lasers are employed and separate light sources are provided for the main and auxiliary beams. The lasers 10B and 10C operate at different wave lengths, 10B providing the main beam and 10C providing the auxiliary beam. The two beams are combined by means of a reflector 104 and traverse essentially the same path through the optical system to the beam splitter 18C.

Beam splitter 18C is a wave length selective filter which permits the passage of the main beam and reflects the auxiliary beam through the graticule 22 to the photoresponsive device 24. The gallium arsenide lasers can be modulated directly with printing data signals. Therefore, the acousto-optical modulator 80 of FIG. 8 is not used, and is not available to provide the transverse error correction.

Figure 10:
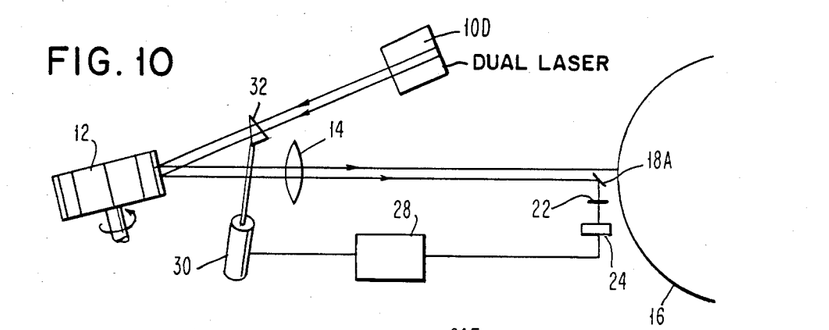
FIG. 10 is a schematic representation of still another modification of the system of FIGS. 1 and 2 employing a dual laser as the light source for the main and auxiliary beams and in which those beams are produced for transmission in parallel optical paths.

FIG. 10 is another alternative embodiment of the system of FIGS. 1 and 2 which also uses a gallium arsenide solid state laser 10D. Laser 10D is a dual laser which is operable to emit separate beams which travel in parallel over substantially the same path, but which are slightly separated so as to permit the use of a full reflector 18A to reflect the auxiliary beam through the graticule 22 to the photodetector 24.

Figure 11:
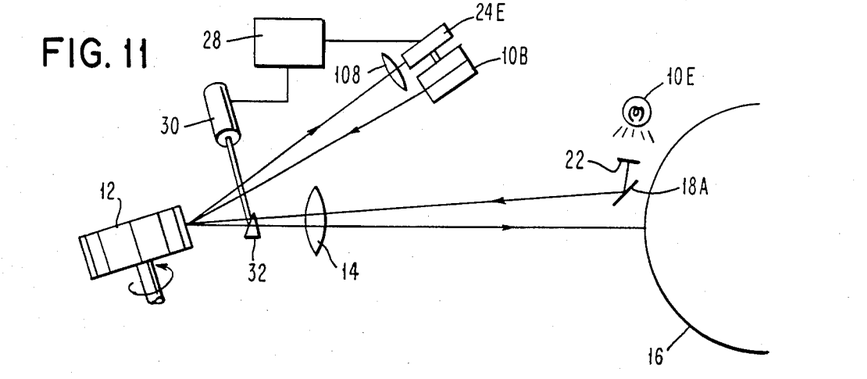
FIG. 11 is a schematic representation of still another modification of the system of FIGS. 1 and 2 in which two light sources are employed, and in which the auxiliary beam is directed in a reverse direction through the optical system in relation to the main beam.

FIG. 11 is still another modification of the embodiment of FIGS. 1 and 2 in which the main beam and the auxiliary beam travel substantially the same optical path, but in reverse directions. A main source of radiation for the main beam is the solid state gallium arsenide laser 10B. However, the auxiliary beam is provided by means of a light source 10E which illuminates the entire graticule 22. The entire image of the graticule 22 is reflected by the reflector 18A and is carried back through the optical system represented by the lens 14, and that image is scanned by the rotating polygonal mirror 12 across a photodiode 24E. As seen in the drawing, the main and auxiliary beams are closely associated with one another and traverse substantially the same path, although slightly separated at both the beginning and the end of each path. Additional optical means may be provided, as indicated by a lens 108, for concentrating the scanned image elements of the graticule at the photodiode 24E.

The result of the scanning of the image of the illuminated graticle 22 across the photodiode 24E is substantially similar to the scanning of the graticule in the systems previously described, since a lateral displacement of the scan will change the signal as received at the photodiode from the graticule in a way such as to provide for correction signals for correcting the lateral deviation.

An important advantage of each of the embodiments of FIGS. 7, 9, 10 and 11 is that the auxiliary beam is always present to provide the correction function, no matter what modulation there may be on the main beam for purposes of controlled printing. On the other hand, when the embodiments of FIGS. 1 and 8 are used for printing, the auxiliary beam is not present when the main beam is modulated off for spaces which are not to be printed. Accordingly, the operation of each of the embodiments of FIGS. 1 and 8 for transverse beam correction is more reliable when they are simply used as scanners, without print modulation, or when there are very few gaps in the printing operation.

In all of the embodiments of the invention described above, a polygonal mirror has been employed as the scanning means. However, it will be apparent that an oscillating mirror, a holographic deflector, or other deflection means can also be used as the means for imparting the scanning motion to the beams.

The beam splitter 18 of FIG. 1, the beam splitter 18C of FIG. 9, and the reflectors 18A of FIGS. 7, 8, 10, and 11, are each sometimes referred to herein as an auxiliary reflector. It is apparent that, in each case, the auxiliary reflector is tilted about an axis substantially parallel to the path of the scan and perpendicular to the direction of the main scanning beam. In most instances, the angle of tilt is substantially 45 degrees.

The frequencies of operation of the scanning and spot position correction systems of the present invention are relatively high. For example, the rotating multifaceted mirror 12 may rotate at a speed of 20,000 revolutions per minute and may have 20 facets. This results in a scan frequency of 400,000 scans per minute or 6,666 scans per second. With a 75 element graticule, this results in an auxiliary scanning beam interruption frequency by the graticule of 500 kilohertz. This high frequency of operation assures a very rapid correction for lateral deviations which can accurately compensate for mechanical vibrations of the apparatus. This permits lighter and less rigid construction for the structure of the scanner and its associated apparatus.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

We claim:

1. A scanning optical beam system comprising a primary scanning means which produces a scanning optical beam having a scan path close to the desired scan path, a photoresponsive error sensing means which measures over substantially the entire scan path the successive differences transverse to the scan direction between the actual position of the scanning beam and the desired position of the scanning beam and produces error signals, and a secondary scanning means connected to said error sensing means for response to said error signals and operable to dynamically correct the position of the scanning beam transverse to the scan direction during the course of the scan so as to reduce the measured errors.

2. A system as claimed in claim 1 wherein said primary scanning means includes means for providing a main optical scanning beam and means for providing an auxiliary optical scanning beam traversing substantially the same optical path as said main scanning beam but including means for separation of at least one end of the auxiliary beam from the main beam, and said error sensing means including means arranged in the separated portion of the path of said auxiliary beam to provide for detection of the successive differences between the actual position of the scanning beam and the desired position of the scanning beam in terms of the position of said auxiliary beam.

3. A system as claimed in claim 2 wherein said auxiliary beam defines an original beam path and wherein there is provided within said separated portion of said auxiliary beam a retro-reflector graticule having a substantially uniform average reflectivity along the desired scan path and a graded average optical reflectivity transverse to the desired scan path, said graticule retro-reflector being arranged to reflect the radiation of the auxiliary beam in a reverse direction path back along the original path of the auxiliary beam, a beam splitter arranged in the reverse direction path of said auxiliary beam and operable to intercept and split off at least a portion of the auxiliary beam reflected by said retro-reflector graticule, and said photoresponsive error sensing means being positioned to receive the radiation from said beam splitter as modified by said retro-reflector graticule, said error sensing means being connected to said secondary scanning means to dynamically correct the positions of the main scanning beam.

4. A system as claimed in claim 2 wherein said means for providing an auxiliary optical scanning beam includes an auxiliary scanning beam source, and wherein there is provided within said separated portion of said auxiliary beam a graticule mask having a substantially uniform average optical density along the desired scan path and a graded average optical density transverse to the desired scan path, said photoresponsive error sensing means being positioned beyond said mask on the side opposite to the auxiliary scanning beam source and arranged to receive illumination signals from said auxiliary scanning beam as modified by said mask, said error sensing means being connected to said secondary scanning means to dynamically correct the positions of the main scanning beam.

5. A system as claimed in claim 4 wherein said desired scan path is substantially straight.

6. A system as claimed in claim 4 wherein said desired scan path is curvilinear.

7. A system as claimed in claim 4 wherein said secondary scanning means is operable to dynamically correct the positions of the auxiliary scanning beam as well as the main scanning beam to thereby provide closed loop servo positioning of said scanning beams.

8. A system as claimed in claim 4 wherein the graded optical density of said graticule mask is provided by discrete uniformly shaped and uniformly spaced mask elements distributed along the desired scan path, said elements having wider dimensions along the side of said mask which is to have the greater optical density, and narrower dimensions on the side of said optical mask which is to have the lesser optical density.

9. A system as claimed in claim 8 wherein said mask elements form a pattern resembling the toothed edge of a saw blade.

10. A system as claimed in claim 8 wherein said mask elements comprise elongated substantially parallel figures arranged transverse to the desired beam scan direction and in which said elements are wide on the side of said graticule providing greater optical density and narrow on the side providing lesser optical density.

11. A system as claimed in claim 10 which includes means for transferring information through said scanning beam and means for synchronizing the transfer of information through said scanning beam with the beam scan, said synchronizing means being connected to receive signals from said error sensing means, said synchronizing means being operable in response to the successive interruptions of the signals from said error sensing means arising from the scan of the auxiliary beam across said parallel mask elements to synchronize said information transfer means.

12. A system as claimed in claim 10 in which the scans of said main beam and of said auxiliary beam are intended to be unidirectional, and wherein said mask elements each include a uniformly substantially straight and substantially mutually parallel leading edge which is first intercepted by the auxiliary scanning beam, and wherein the wider dimension on the higher optical density side of each mask element is positioned entirely at the trailing edge which is last scanned by the scanning beam.

13. A system as claimed in claim 12 wherein said mask elements each consist of a narrow line on the low optical density side and a wide line on the high optical density side with a sloped transition profile from the narrow line to the wide line near the center-line of said graticule mask.

14. A system as claimed in claim 4 wherein said primary scanning means includes a laser as the source of illumination.

15. A system as claimed in claim 14 wherein said laser is a helium neon laser.

16. A system as claimed in claim 14 wherein said laser is a gallium arsenside laser.

17. A system as claimed in claim 14 wherein said primary scanning means includes a physically movable mirror.

18. A system as claimed in claim 17 wherein said movable mirror is a rotating polygonal mirror.

19. A system as claimed in claim 14 wherein an auxiliary optical reflector is provided for deflecting said auxiliary scanning beam with respect to said main scanning beam and wherein said auxiliary reflector is associated with said means for separation of said one end of the auxiliary beam from the main beam, said auxiliary reflector being tilted about an axis substantially parallel to the path of scan and perpendicular to the direction of said main scanning beam.

20. A system as claimed in claim 19 including common imaging optical elements for said main beam and said auxiliary beam which are arranged to focus the image of said main beam at a plane corresponding to the surface to be scanned, said graticule being arranged in a conjugate image plane within the separated end of said auxiliary beam.

21. A system as claimed in claim 19 wherein said auxiliary reflector is combined with said means for separation of said one end of said auxiliary beam from said main beam and wherein said auxiliary reflector comprises a beam splitter which reflects part of the beam energy and transmits the rest.

22. A system as claimed in claim 14 including a rotating drum for carrying the scanned image.

23. A system as claimed in claim 22 which is combined in an optical printer.

24. A system as claimed in claim 4 wherein said means of separation of said auxiliary beam from said main beam includes separate sources of illumination for said main beam and said auxiliary beam.

25. A system as claimed in claim 24 wherein said separate illumination sources are lasers of different wave lengths and wherein said means for separation of said main beam and said auxiliary beam includes a wave length selective filter operable to pass one of the beams and to reflect the other one of the beams.

26. A system as claimed in claim 24 wherein said separate light sources comprise two lasers arranged to provide separate main and auxiliary scanning beams traversing the same optical system but in physically separated substantially parallel beams.

27. A system as claimed in claim 26 wherein said two lasers for providing said separate beams are combined in a single dual laser structure.

28. A system as claimed in claim 24 wherein said lasers are gallium arsenside lasers.

29. A system as claimed in claim 24 wherein said light source for the main beam comprises a laser and wherein said error sensing means comprises a photoresponsive pickup device positioned closely adjacent to said laser to receive optical signals from an auxiliary optical scanning beam which traverses substantially the same optical path as the main scanning beam but in a reverse direction from the graticule through the optical path to said error sensing means, said light source for said auxiliary beam being positioned in said optical path on the side of said graticule away from said error sensing means and being operable to illuminate the entire graticule, the optical elements of said optical path being operable to carry an image of the entire graticule back to said error sensing means, and said scanning means being operable to scan the graticule image across said error sensing means, the optical paths of said main and auxiliary beams being closely adjacent to one another and separated at each end of the respective optical paths.

30. A system as claimed in claim 4 including a modulating means for modulating said main beam to provide for optical printing during scan, said means for separation of said auxiliary beam from said main beam being combined in said modulating means, said modulating means comprising an acousto-optic modulator which is arranged in the optical path of the main beam and which is operable during modulation to deflect a part of said main beam to a desired scan position to provide for optical printing at that position, said acousto-optical modulator being operable to pass at least part of the main beam energy continuously in an unmodulated and undeflected beam which comprises the auxiliary beam, and means for deflecting the auxiliary beam away from the surface being scanned to said graticule.

31. A system as claimed in claim 30 including a helium neon laser light source for providing both said main and auxiliary beams.

32. A system as claimed in claim 10 wherein said mask elements are shaped to provide a non-uniform rate of change in width when measured from one side of the graticule to the other, with the greatest rate of change occurring in the central portion across the desired scan path to enhance the sensitivity of the system to changes in transverse positions.

* * * * *